Patented June 26, 1945

2,379,389

UNITED STATES PATENT OFFICE 2,379,389

RUBBER OR RUBBERLIKE COMPOSITION AND METHOD

Neil E. Tillotson, Watertown, Mass.

No Drawing. Application December 14, 1942,
Serial No. 469,000

12 Claims. (Cl. 260—27)

This invention relates to compositions of the type containing rubber or rubber-like materials and more particularly to compositions of said type containing a novel agent which provides for improved plasticity and tackiness of the compositions when employed as adhesives and during fabrication into articles to be vulcanized and an improved bond between plies of the rubber or rubber-like material or with other materials when vulcanizable compositions containing the agent are vulcanized, as well as rendering the unvulcanized rubber or rubber-like composition easier to mill and mix with various compounding ingredients. The invention also includes the method of improving the plasticity, tackiness and bond of compositions of the type above-mentioned.

The invention finds its major utility with rubber or rubber-like vulcanizable compositions which are deficient in the tackiness and plasticity which are necessary for successfully building up coherent multi-ply articles such as tires, for fabricating articles requiring joints or seams between various portions or for producing adherence between the vulcanizable composition and other materials. So-called synthetic rubber of the Buna S type which is a copolymer of butadiene and styrene polymerized in aqueous suspension, and certain types of reclaimed natural rubber are outstanding examples of materials of the rubber type which lack sufficient tackiness, bonding properties and plasticity for successful fabrication although many other rubber-like materials exhibit this deficiency to a greater or less degree. It has been proposed to add sufficient virgin natural rubber to such materials in order to impart the necessary plasticity, tackiness and bonding properties but the amount of such virgin rubber required is usually sufficiently great to defeat the very purpose of so-called synthetic rubbers or reclaimed rubbers, which is the production of compositions usable instead of virgin rubber.

In accordance with the present invention I have found that the resins or gums having the characteristics of those obtained from certain tropical trees, when added to compositions of the type above discussed, not only impart to the compositions the necessary tackiness and plasticity for fabrication but also produce excellent bonding in vulcanized products between the various plies or portions of the rubber or rubber-like material and between the rubber or rubber-like material and other material such as metal, fabric, cords, etc. as well as preserving or increasing the desirable properties of the composition such as modulus of elasticity, elongation, tensile strength, resistance to flex cracking, etc. While successful bonding is, in general, not obtainable in the absence of substantial tackiness of vulcanizable compositions prior to vulcanization, such tackiness does not insure the production of an effective bond or the preservation of the desired properties above enumerated, since tackiness itself may be produced by various materials which have no effect upon or even decrease the bonding characteristics upon vulcanization or destroy or impair certain or all of the desired properties above referred to. The increased bonding effect of the agent employed in the present invention may result at least in part from the fact that the agent is a viscous, sticky liquid or semi-liquid which is itself vulcanizable, i. e., it combines with sulphur or other known vulcanizing agents to form a more viscous semi-liquid, plastic, or solid material which adheres tenaciously to other materials.

I have further found that with certain rubber or rubber-like materials the tackifiers or bonding agents of the present invention may be added in sufficient amounts to form a very substantial portion of the composition before deleteriously affecting the properties of the rubber or rubber-like materials so that the agents may be employed as extenders to reduce the amount of rubber or rubber-like materials necessary for the production of a given article. In general the employment of substantial amounts of the bonding agents of the present invention also enable increased amounts of compounding ingredients or fillers such as carbon black, etc., to be employed without deleterious effect and in some cases even with improved results to still further decrease the amount of rubber or rubber-like materials required. Also the addition of the agents of the present invention very materially increases the plasticity during milling of compositions containing rubber or rubber-like materials thus reducing the time and power required for milling of the composition and increasing the ease with which compounding ingredients may be added on the mill and the ease with which articles may be fabricated from the milled composition. It is therefore desirable to add the agent to the rubber or rubber-like materials early in the milling operation.

An object of the present invention is, therefore, to provide an improved composition containing rubber or rubber-like materials and a novel agent which improves the tackiness and plasticity of the composition.

Another object of the invention is to provide an improved rubber or rubber-like composition in which a vulcanizable bonding agent is employed to increase the plasticity and tackiness of a vulcanizable composition prior to vulcanization and to increase the bonding characteristics of the composition after vulcanization.

Another object of the invention is to provide an improved vulcanizable composition containing rubber or rubber-like materials deficient in tackiness and bonding properties, in which a natural vulcanizable gum or resin is added to obviate such deficiencies.

Another object of the invention is to provide an improved vulcanizable composition of the rubber or rubber-like type in which substantial amounts of a vulcanizable resin and increased amounts of other compounding ingredients are employed.

A further object of the invention is to provide a method of increasing the tackiness and plasticity of vulcanizable rubber or rubber-like composition normally deficient in such properties and increasing the bonding characteristics upon vulcanization of such composition.

A still further object of the invention is to provide an improved method of extending the rubber or rubber-like constituents without deleteriously affecting the properties of such compositions.

The preferred bonding or extending agent of the present invention is the gum or resin obtained from the cativo tree (*Prioria copaifera*) which is a tropical tree of the Leguminosae family classified under the Caesalpiniaceae or Senna sub-family and the Cynometreae tribe. This tree is found in large numbers generally throughout Central America including Colombia and the Canal Zone. The gum or resin can be obtained from the tree by tapping and, as obtained from the tree is a viscous, sticky liquid or semi-liquid of amber or brown color resembling honey in its physical characteristics and appears to be an oleo resin consisting essentially of resin acids of high molecular weight.

In addition to the stickiness of the resin which imparts tackiness to rubber or rubber-like compositions the more important properties of the resin are its capability of being vulcanized and its resistance to thermal decomposition and oxidation. The resin reacts with sulphur under suitable temperature conditions to produce more viscous sticky liquids or plastics, or thermo-plastic solids depending upon the proportions of sulphur and conditions of vulcanization. A thermoplastic solid resembling gutta percha in its physical characteristics can be produced by employing sufficient sulphur and the reaction responds to vulcanization accelerators in substantially the same manner as is the case in the vulcanization of rubber. Thus by employing known or suitable rubber vulcanization accelerators and temperatures the rate and extent of vulcanization can be controlled in substantially any desired manner. Elevated temperatures with appropriate proportions of sulphur or accelerators or both can be employed to produce the desired vulcanization, either in conjunction with or in the absence of rubber or rubber-like vulcanizable materials. The vulcanized resin may thus be rendered more viscous or be converted into a plastic material while still retaining its tackiness and elasticity. By more drastic vulcanizing treatment, a hard thermoplastic solid having a relative high melting point can be produced which upon being softened or melted by the application of heat again becomes sticky or tacky. Excellent adherence of the hard solid to other materials can be obtained by vulcanizing the original resin to the hard state in contact with such other materials or cooling a heat softened or melted, previously vulcanized hard solid in contact with such other materials.

The resin as it comes from the tree has relatively high boiling point, i. e. above 400° C., and can be boiled at atmospheric temperature without apparent thermal decomposition. It exhibits no evidence of thermal decomposition deleteriously affecting its properties at temperatures considerably above its boiling point. It has a somewhat disagreeable odor in its natural state but this odor is largely eliminated upon heating to the boiling point and allowing a small amount of vapors to escape either at atmospheric pressure or at subatmospheric pressure, indicating the presence of a small amount of essential oils or highly volatile odoriferous material. This odor does not persist in vulcanized rubber or rubber-like products containing the resin. After escape of such volatile material the remaining material has a substantially constant boiling point and can be distilled either at atmospheric or subatmospheric pressure to leave a small amount of brown or darker residue indicating that the composition is probably essentially a single chemical compound. The distillate is a water white viscous, sticky liquid at atmospheric temperature similar except for color and odor to the original resin obtained from the tree. For most rubber compositions the resin obtained from the tree is suitable after straining to remove extraneous material such as leaves, bark, etc., usually while heated, to reduce its viscosity. The distilled product, however, retains to a a large extent the properties of the 'crude resin discussed above and is particularly suitable for light colored or white vulcanized compositions.

An analysis of a typical sample of crude cativo resin gave the following results:

| | |
|---|---|
| Ash_____per cent__ | 0.25 |
| Protein (N×6.25)_____do____ | 0.24 |
| Volatile at 105° C_____do____ | 1.60 |
| Acid No_____ | 143.7 |
| Total ether extract_____per cent__ | 100 |
| Saponification No_____ | 163.3 |
| Iodine No_____ | 92.6 |
| Unsaponifiables_____per cent__ | 7.43 |

The same resin when distilled to produce a water white distillate free from volatile ash, etc., gave an acid number of 177.1 and a saponification number of 179.2.

The crude resin as well as the distilled resin is soluble in many organic solvents including hydrocarbon solvents. Thus one part of resin was found to be completely soluble in five parts of ethyl alcohol, butyl alcohol, ethyl acetate, toluene, petroleum ether, and carbon tetrachloride. The crude resin is incompletely soluble in acetone, the insoluble portion representing approximately 3% of the total resin.

The cativo resin either in the crude or distilled form, reacts readily with magnesium and calcium oxide to produce a hard brittle solid, but reacts with zinc oxide only at a greatly reduced rate. This latter material may, therefore, be employed as a compounding ingredient in vulcanizable compositions containing the resin in any suitable or usual proportions without deleterious effect upon the resin. The reaction with magnesium oxide takes place rapidly even at room temperature while the reaction with calcium oxide is somewhat slower. The resulting products are thermo-plastic and when softened or melted by the application of heat become sticky or tacky in a manner similar to the vulcanized products. By employing lesser amounts of such oxides semi-liquid or less brittle thermoplastic solids can be produced. Sulphur or other vulcanizing agents can be employed in varying proportions with the oxides to produce products having various properties. In general the employment of sulphur or other vulcanization agents results in products resembling gutta percha whereas the employment of the oxides results in products having more rosin-like or more brittle physical properties. By varying the proportions of vulcanizing agent to oxides products can be obtained having properties intermediate between those above described. The resin can also be reacted with alkaline compounds of alkali metals. Thus sodium hydroxide may be employed to neutralize the acidity of the resin without much much change in the physical characteristics thereof. One effect is to somewhat increase the curing time and temperature during vulcanization.

The resin is particularly resistant to reaction with oxygen both in its free form and in combination with rubber or rubber-like material thus imparting anti-aging properties and even flame resistant properties to compositions in which it is employed in substantial amounts. Thus the flame resisting properties are retained when the resin is vulcanized or reacted with alkali metals or the various oxides discussed above, as well as when the resin is incorporated into rubber or rubber-like compositions. The resin itself or the reaction products discussed above are not soluble in water but in most cases can be readily emulsified or suspended in finely divided form in water with suitable emulsifying agents.

When even small amounts, for example 1 to 2 percent by weight of the cativo resin on the basis of the rubber-like material employed, are incorporated into vulcanizable compositions containing synthetic rubbers which are deficient in tackiness, the plasticity and tackiness are increased sufficiently for most uses such as building up multi-ply articles or retreading tires and this adherence persists in the vulcanized product causing the various layers to tenaciously cohere or adhere to other materials such as previously vulcanized rubber fabric, etc. It is rarely necessary to employ more than 2% of the resin and no case has been found where more than 5% is required. Such small amounts of resin materially increase the workability of the composition and enable some increase in proportions of other compounding ingredients. The presence of the resin does not deleteriously affect the tensile strength, modulus of elasticity or elongation of the vulcanized composition and in some cases may even improve certain of these properties. In fact, with certain so-called synthetic rubber compositions, notably those containing Buna S, substantially no impairment of the desirable properties of the composition occur even when resin in amounts up to 15 or 20% or even 30%, depending upon the character of the rubber or rubber-like materials, is incorporated into the composition. That is, the composition does not begin to assume resin-like characteristics until the resin content approaches 20 to 30% of the rubber or rubber-like constituents. For example with Buna S, 5 to 20% of the resin may be advantageously employed as an extender although 2 to 5% is usually sufficient for producing the required tackiness. The large amounts of resin have the further advantage of enabling greater amounts of other desirable compounding ingredients, such as carbon black, to be employed. For example with Buna S, a product having specified properties as to tensile strength, elongation, etc., was compounded with approximately 50% carbon black on the basis of the synthetic rubber along with small amounts of other ingredients, such as zinc oxide, whereas with 15% added cativo resin the amount of the carbon black which could be employed to produce substantially the same properties was increased to 70%. Thus in the first composition the synthetic rubber was approximately 65% of the composition whereas in the composition containing 15% cativo resin the synthetic rubber was approximately 57% of the total composition. The carbon black selected was channel black a particularly "hard" black, and with softer blacks even greater amounts can be employed. Furthermore, the composition containing the resin exhibited excellent tackiness and plasticity before vulcanizing and developed strong bonding properties upon vulcanizing, characteristics as to which Buna S is notably deficient. Also, the composition containing the resin required much less milling time and power to thoroughly plasticize the same and incorporate the compounding ingredients.

Similar results can be obtained with compositions containing substantially any of the other synthetic rubbers. Thus, in many cases the resin can be employed in substantial amounts as an extender for natural or synthetic rubbers such as neoprene, which is polymerized chloroprene, a chlorine substituted butadiene, Buna N, which is a copolymer of butadiene and acrylic nitrile, Thiocols which are olefin polysulfides, etc., irrespective of whether it is necessary to increase the tackiness and bonding properties of the rubber-like materials. The amount of resin employed will depend upon the nature of the compounding ingredients used as well as that of the rubber or rubber-like materials and the characteristics of the article desired, so that no definite proportions can be given even for Buna S. In general, a small amount of resin, for example 2 to 5% is sufficient to supply a deficiency in plasticity, tackiness or bonding properties. In some compositions amounts up to 15 to 25% or even 30% can be employed without substantially modifying the rubber-like properties of the compositions but greater amounts, for example 40 to 50% or more produce resin-like products which may, however, have some of the characteristics of rubber. In general, it has been found that smaller amounts, for example ½ to 5%, usually ½ to 2% of the resin must be employed with natural rubber compositions than with synthetics such as Buna S if the desirable rubber-like properties of the composition are retained. Thus with pure gum compositions, ½% of the resin is usually sufficient while with natural rubber compositions which are heavily loaded with fillers and other compounding ingredients, up to 5% may be employed although 2% is usually sufficient. As a general rule, the greater the amount of resin which is employed within the limits above given, the greater the amount of other compounding ingredients on the basis of the rubber or rubber-like materials which can be incorporated into the vulcanizable composition without unduly increasing the hardness of the vulcanized product. The resin may thus be considered a softening agent but differs from known softening agents in that it also increases tackiness and bonding properties and can be employed in sufficient amounts to produce the desired softening effect without also impairing the tensile strength, elongation, modulus of elasticity, etc. With certain rubber-like materials, notably Buna S, certain of these properties are materially improved. It will be apparent that the amounts and nature of the other compounding ingredients will vary as in the usual rubber technology depending upon the characteristics desired in the final product.

Vulcanization of rubber or rubber-like compositions containing the resin of the present invention is in general similar to vulcanization of the various compositions not containing the resin. Sufficient sulphur either as free sulphur or in compounds such as certain accelerators containing available sulphur or equivalent vulcanizing materials known to the art must be supplied in sufficient amounts to not only supply the sulphur demand of the rubber but also that of the resin. The amount of sulphur as well as the temperature and time of vulcanization will depend upon the desired hardness of the vulcanized product and temperature and time of vulcanization will also depend upon the amount and nature of any accelerators employed.

As specific examples showing compositions containing cativo resin in accordance with the present invention and comparisons between such compositions and other compositions, the following tables are given

TABLE I

| Composition | 1 | 2 | 3 | 4 |
|---|---|---|---|---|
| Buna S | 100 | 100 | 100 | 100 |
| Agerite white | 1 | 1 | 1 | 1 |
| Zinc oxide | 3 | 3 | 3 | 3 |
| Altax | 1.5 | 1.5 | 1.5 | 1.5 |
| D. P. G | .5 | .5 | .5 | .5 |
| Sulfur | 2 | 2 | 2 | 2 |
| Thermax | 100 | 100 | 150 | 150 |
| Cativo resin | | 20 | 20 | 30 |

Tensile properties

| Press cures at 290° F. | S | T | E | S | T | E | S | T | E | S | T | E |
|---|---|---|---|---|---|---|---|---|---|---|---|---|
| 15 min | 1,035 | 1,275 | 400 | 425 | 1,400 | 940 | 820 | 1,325 | 720 | 530 | 1,065 | 920 |
| 30 min | 1,090 | 1,240 | 375 | 615 | 1,850 | 825 | 990 | 1,300 | 610 | 740 | 1,360 | 765 |
| 45 min | 1,165 | 1,350 | 390 | 655 | 1,815 | 735 | 1,030 | 1,260 | 550 | 810 | 1,380 | 715 |

Tear resistance

| 15 min | 140 | 175 | 210 | 200 |
|---|---|---|---|---|
| 30 min | 120 | 220 | 180 | 225 |
| 45 min | 115 | 180 | 180 | 200 |

Shore hardness

| 30 min | 63 | 50 | .61 | 55 |
|---|---|---|---|---|

TABLE II

| Composition | 5 | 6 | 7 | 8 |
|---|---|---|---|---|
| Buna S | 100 | 100 | 100 | 100 |
| Agerite white | 1 | 1 | 1 | 1 |
| Zinc oxide | 3 | 3 | 3 | 3 |
| Altax | 1.5 | 1.5 | 1.5 | 1.5 |
| D. P. G | .5 | .5 | .5 | .5 |
| Sulfur | 2 | 2 | 2 | 2 |
| P-33 | 100 | 100 | 100 | 150 |
| Cativo resin | | 20 | 30 | 30 |

Tensile properties

| Press cures at 290° F. | S | T | E | S | T | E | S | T | E | S | T | E |
|---|---|---|---|---|---|---|---|---|---|---|---|---|
| 15 min | 1,230 | 1,365 | 345 | 500 | 1,750 | 745 | 350 | 1,630 | 940 | 705 | 1,285 | 700 |
| 30 min | 1,255 | 1,270 | 310 | 610 | 1,800 | 660 | 480 | 1,885 | 815 | 840 | 1,260 | 610 |
| 45 min | 1,240 | 1,305 | 315 | 620 | 1,785 | 640 | 500 | 1,820 | 785 | 835 | 1,300 | 595 |

Tear resistance

| 15 min | 120 | 210 | 180 | 230 |
|---|---|---|---|---|
| 30 min | 115 | 195 | 170 | 200 |
| 45 min | 110 | 175 | 150 | 190 |

Shore hardness

| 30 min | 70 | 60 | 56 | 71 |
|---|---|---|---|---|

TABLE III

| Composition | 9 | 10 | 11 | 12 |
|---|---|---|---|---|
| Buna S | 100 | 100 | 100 | 100 |
| Agerite white | 1 | 1 | 1 | 1 |
| Zinc oxide | 3 | 3 | 3 | 3 |
| Kalvan clay | 100 | 100 | | |
| Dixie clay | | | 100 | 100 |
| Altax | 1.5 | 1.5 | 1.5 | 1.5 |
| D. P. G | .5 | .5 | .5 | .5 |
| Sulfur | 2 | 2 | 2 | 2 |
| Cativo resin | | 10 | | 10 |

Tensile properties

| Press cures at 290° F. | S | T | E | S | T | E | S | T | E | S | T | E |
|---|---|---|---|---|---|---|---|---|---|---|---|---|
| 15 min | 570 | 940 | 400 | 110 | 640 | 1,010 | 320 | 390 | 510 | 110 | 140 | 710 |
| 30 min | 570 | 770 | 345 | 270 | 1,270 | 620 | 590 | 1,100 | 580 | 330 | 1,070 | 780 |
| 45 min | 575 | 760 | 365 | 280 | 1,230 | 610 | 690 | 1,120 | 530 | 370 | 1,130 | 670 |

Tear resistance

| 15 min | 130 | 120 | 105 | 49 |
|---|---|---|---|---|
| 30 min | 105 | 105 | 160 | 110 |
| 45 min | 120 | 105 | 160 | 110 |

Shore hardness

| 30 min | 59 | 52 | 61 | 51 |
|---|---|---|---|---|

TABLE IV

| Composition | 13 | 14 | 15 |
|---|---|---|---|
| Buna S | 100 | 100 | 100 |
| Agerite white | 1 | 1 | 1 |
| Zinc oxide | 3 | 3 | 3 |
| Channel black (hard carbon black) | 60 | 60 | 60 |
| Altax | 1.5 | 1.5 | 1.5 |
| D. P. G | .5 | .5 | .5 |
| Sulfur | 2 | 2 | 2 |
| Cativo resin | | 20 | |
| Pine tar | | | 20 |

Tensile properties

| Press cures at 290° F. | S | T | E | S | T | E | S | T | E |
|---|---|---|---|---|---|---|---|---|---|
| 15 min | 1,830 | 2,710 | 390 | | | | | | |
| 30 min | 2,730 | 2,890 | 330 | 1,335 | 2,530 | 460 | 930 | 2,130 | 520 |
| 45 min | 2,930 | 2,970 | 310 | 1,565 | 2,710 | 450 | 1,095 | 2,280 | 480 |
| 60 min | | | | 1,635 | 2,890 | 430 | | 2,340 | 450 |

Tear resistance

| 15 min | 220 | --- | --- |
|---|---|---|---|
| 30 min | 210 | 155 | 180 |
| 45 min | 160 | 200 | 210 |
| 60 min | --- | 200 | 195 |

Shore hardness

| 30 min | 68 | 59 | 55 |
|---|---|---|---|

TABLE V

| Composition | 16 | 17 | 18 |
|---|---|---|---|
| Buna S | 100 | 100 | 100 |
| Agerite white | 1 | 1 | 1 |
| Zinc oxide | 3 | 3 | 3 |
| P-33 (soft carbon black) | 100 | 100 | 100 |
| Altax | 1.5 | 1.5 | 1.5 |
| D. P. G | .5 | .5 | .5 |
| Sulfur | 2 | 2 | 2 |
| Cativo resin | | 20 | |
| Gum thus (crude turpentine) | | | 20 |

*Tensile properties*

| Press cures at 290° F. | S | T | E | S | T | E | S | T | E |
|---|---|---|---|---|---|---|---|---|---|
| 15 min | 1,150 | 1,465 | 405 | 575 | 1,845 | 760 | 230 | 410 | 920 |
| 30 min | 1,195 | 1,395 | 390 | 655 | 1,810 | 710 | 320 | 600 | 880 |
| 45 min | 1,240 | 1,395 | 360 | 680 | 1,690 | 665 | 350 | 590 | 770 |

*Tear resistance*

| | | | |
|---|---|---|---|
| 15 min | 175 | 220 | 100 |
| 30 min | 150 | 190 | 130 |
| 45 min | 150 | 220 | 130 |

*Shore hardness*

| | | | |
|---|---|---|---|
| 30 min | 65 | 55 | 72 |

In the above tables under Tensile properties, "S" refers to the stress in pounds per square inch of the original cross-section at 300% elongation usually referred to in the rubber art as the modulus of elasticity; "T" refers to the tensile stress at rupture in pounds per square inch of the original cross-section; and "E" refers to the percent elongation at rupture of specimens subjected to test in a standard testing machine. The tear resistance is given in pounds per tenth of an inch thickness as the stress necessary to tear a crescent shaped specimen providing differential tension between the two curved edges in accordance with the standard Goodrich method while the hardness was determined with the Shore durometer.

In the various compositions above given, Agerite White is N,N'di-beta-naphthyl-para-phenylenediamine (an age resistor); Altax is benzolthiozyl disulphide (an accelerator); D. P. G. is diphenylguanidine (an accelerator); Thermax is a soft carbon black; P-33 is another soft carbon black; Kalvan is a clay employed in many rubber compositions, and the same is true of Dixie clay; channel black is a hard carbon black and gum thus is a crude, almost solid, turpentine. While for the purpose of providing comparative tests, Buna S has been employed as the rubber-like material throughout the above examples, it is to be understood that similar results can be obtained with other synthetic rubbers.

Referring to Table I, it will be noted that the composition 2 which differs from composition 1 solely by the addition of 20% cativo resin developed a much higher tensile strength after vulcanization as well as a much lower modulus and a much higher elongation. The tear resistance was also substantially doubled although the hardness was considerably decreased. In interpreting the figures under the heading Tensile properties in all of the tables, the greatest figure in any column is usually given the greatest weight as even slight changes in composition will frequently vary the curing time for optimum properties and in commercial operations the curing time which develops the desired properties is selected. The same is true for tear resistance.

A comparison of compositions 1, 2, and 3, the latter of which differs from composition 2 only by a 50% increase of carbon black, shows that increasing the carbon black somewhat reduces the tensile strength and increases the hardness while at the same time increasing the modulus and somewhat decreasing the elongation. In fact a comparison of compositions 1 and 3 will show that the physical properties are of substantially the same order in both of these compositions, although composition 3 contains 50% more carbon black and 20% cativo resin. Thus, composition 3 which contains approximately 35% Buna S has substantially the same physical properties as composition 1 which contains approximately 48% Buna S. Composition 4 which differs from composition 3 by the addition of more cativo resin is still a good product in comparison with compotion 1 although it contains even less Buna S.

Referring to the examples of Table II, which differ essentially from the examples of Table I by the employment of a different carbon black, it will be noted that equivalent compositions produce about the same result with either Thermax carbon black or P-33 carbon black, the only major difference being that the P-33 carbon black maintains the hardness more nearly the same as cativo resin is added.

The compositions of Table III in comparison with the compositions of Tables I and II show that soft carbon black are much more effective in developing high tensile strengths and other desirable properties with synthetic rubber compositions than is the case with clays. It will be noted that the presence of small amounts of cativo resin very materially increase the tensile strength and the elongation of compositions containing Kalvan clay, but was not as effective with Dixie clay.

Referring to Table IV it will be noted by comparison of compositions 13 and 14, that the addition of 20% cativo resin left the tensile strength of compositions containing a hard carbon black approximately the same while decreasing the modulus and increasing the elongation. The tear resistance remained substantially the same while the hardness was somewhat decreased. Composition 15 in comparison with composition 14 shows that pine tar, a common plasticizer in rubber compositions, is not the equivalent of cativo resin as this material very much lowered the tensile strength and hardness although the elongation was increased and the modulus lowered.

Referring to Table V, compositions 16 and 17 therein contain the same materials in the same proportions as compositions 5 and 6, respectively, of Table II, but were made and vulcanized on a different date. The properties of the equivalent compositions agree very closely, but due to unavoidable slight differences in procedure, particularly in vulcanizing conditions, are not identical. Table V is given to compare the effect of cativo resin and gum thus upon the physical properties of Buna S compositions. Compositions 16 and 17 duplicate compositions 5 and 6 of Table II in order to provide a comparison with composition 18 which was processed under the same conditions as compositions 16 and 17. It will be noted that the addition of 20% cativo resin to composition 16 to produce composition 17, very materially increases the tensile strength, decreases the modulus and increases the elongation and resistance to tear, while decreasing the hardness. On the other hand, gum thus decreased the tensile strength to about half that of composition 16, although it decreased the modulus and increased the elongation, but also materially decreased the tear resistance while at the same time very much increasing the hardness.

From the above examples it will be seen that the addition of substantial amounts of cativo resin to conventional vulcanizable rubber-like compositions containing Buna S in general improves the desirable qualities of such compositions, particularly those containing soft carbon black. In any event there is, in general, no impairment of the desirable qualities. Also, in general, additional amounts of fillers can usually be employed in compositions containing cativo resin to produce vulcanized compositions having properties similar to those containing no cativo resin. Thus, the cativo resin functions as an extender for the rubber-like material. As stated above, similar results can be obtained with other rubber-like materials and, in addition, the vulcanizable composition is plasticized to produce easier milling and incorporation of compounding ingredients and the tackiness of the vulcanizable composition is materially increased while the bonding properties of the vulcanized composition are at the same time increased.

It will also be apparent that the resin of the present invention is an advantageous ingredient of rubber adhesives. Such adhesives are generally unvulcanized compositions containing rubber or rubber-like materials and desirably have a permanent tack. The resin increases the tackiness of such adhesives and because of its high stability, i. e. resistance to oxidation, drying, etc., the adhesives do not lose their desirable properties over long periods of time. It forms an effective adhesive ingredient in such products as rubber tape for electrical insulation or in friction tapes. Also, adhesives may either by employed as a solution in rubber solvents or as an aqueous suspension, for example in rubber cements or shoe cements. The resin is not soluble in water but may be easily emulsified in water by substantially any of the known emulsifying agents tending to produce oil in water emulsions. Thus the resin may be incorporated into natural or artificial latex cements.

While cativo resin has been specifically discussed above, resins from other related trees or plants may also be employed. It has been found that the resin from the copaiba tree (*Copaifera officinalis*) also sometimes known as the copaiva tree is essentially similar to the resin from the cativo tree except that it usually contains a greater amount of volatile material or essential oils which can be removed by heating. This tree is found throughout tropical America and is classified in the same sub-family and tribe as the cativo tree. There are a large number of species of trees classified under the genus copaifera, many of which also yield resins having the characteristics of the cativo resin although the cativo tree is placed under a different genus, namely *Prioria*, and represents the only known species under that genus. It can, therefore, be reasonably predicted that many other trees or shrubs classified under the tribe Cynometreae will also yield resins having the characteristics of cativo resins and that the same is true of trees or shrubs classified under the sub-family Caesalpinioideae. The botanical classification for this sub-family is as follows:

Family------ Leguminosae
Sub-family-- Caesalpinioideae
Tribe-------- Cynometreae
    Genus--- Cynometra, about 25 species
    Genus--- Pterogyne, 1 species
    Genus--- Prioria, 1 species, copaifera (cativo tree)
    Genus--- Copaifera, about 35 species including *officinalis* (copaiba tree)
Tribe-------- Amherstieae
    Genus--- Hymenaea (about 10 species)
    Genus--- Eperua (about 8 species)

The present invention is therefore concerned with the employment of resins having the characteristics of the resin from the cativo tree, particularly the resins from the resin yielding trees of the sub-family Caesalpinioideae of the Leguminosae family of plants as an ingredient in rubber or rubber-like compositions, the more important characteristic of said resins being that they consist essentially of resin acids of high molecular weight, are substantially non-oxidizing and non-drying, are highly resistant to thermal decomposition, have flame resistant properties, are vulcanizable and have excellent adhesive properties which are retained when admixed with rubber or rubber-like compositions. By the term "rubber or rubber-like materials" as employed herein is meant polymers of the elastomer type including natural rubber and so-called synthetic rubber such as Buna S, Buna N, Thiocols, neoprene, etc., which resemble natural rubber as to physical properties.

While I have disclosed the preferred embodiment of my invention, it is understood that the details thereof may be varied within the scope of the following claims.

I claim:
1. A composition of matter comprising a butadiene rubber material in which is incorporated a sticky, substantially non-oxidizable, flame resistant vegetable resin selected from the group consisting of cativo resin and copaiba resin.

2. A composition of matter having adhesive properties comprising a butadiene rubber containing a substantial amount of an added resin selected from the group consisting of cativo resin and copaiba resin, said resin being present in an amount materially less than the amount of the butadiene rubber.

3. A vulcanizable composition comprising a butadiene rubber deficient in tackiness and bonding properties and a viscous, sticky vulcanizable substantially non-oxidizable vegetable resin selected from the group consisting of cativo resin and copaiba resin and added in sufficient amount to render said composition tacky and impart improved bonding properties to said composition when vulcanized.

4. A composition of matter capable of being vulcanized to produce a product having rubber-like properties, said composition comprising a vulcanizable butadiene rubber, a vulcanizing agent, a substantial amount of an added viscous, sticky, substantially non-oxidizable, vulcanizable vegetable resin selected from the group consisting of cativo resin and copaiba resin, and other rubber compounding ingredients, said resin being present in an amount materially less than the amount of butadiene rubber.

5. A composition of matter capable of being vulcanized to produce a product having rubber-like properties, said composition comprising a vulcanizable butadiene rubber material, a vulcanizing agent, a substantial amount of cativo resin, and other rubber compounding ingredients including carbon black, said resin being present in an amount materially less than the amount of butadiene rubber.

6. A vulcanizable composition comprising a vulcanizable butadiene rubber deficient in tackiness and bonding properties, a substantial proportion of carbon black, and a viscous, sticky vulcanizable resin selected from the group consisting of cativo resin and copaiba resin in sufficient amount to render said composition tacky and impart improved bonding properties to said composition when vulcanized, said resin being added in amounts between 20 and 30% of the rubber or rubber-like material and being characterized by its property of enabling the amount of carbon black in the composition to be increased from 40 to 50% over that usable in the absence of the resin without substantial impairment of the tensile strength and elasticity of the composition when vulcanized.

7. A vulcanizable composition comprising a vulcanizable butadiene rubber comprising essentially a copolymer of butadiene and styrene, a vulcanizing agent, an added viscous, sticky, vulcanizable vegetable resin selected from the group consisting of cativo resin and copaiba resin in an amount between 15 and 20% of the butadiene rubber, and sufficient carbon black to provide the composition with the desired hardness without substantial impairment of the elasticity and tensile strength of the composition when vulcanized.

8. A vulcanizable composition comprising a butadiene rubber deficient in tackiness and bonding properties admixed with a viscous, stticky, vulcanizable substantially non-oxidizable vegetable resin selected from the group consisting of cativo resin and copaiba resin in amounts between approximately 1 and 5% by weight of said butadiene rubber.

9. A vulcanizable composition comprising a vulcanizable butadiene rubber deficient in tackiness and bonding properties admixed with a viscous, sticky, vulcanizable substantially non-oxidizable vegetable resin selected from the group consisting of cativo resin and copaiba resin in amounts between approximately 1 and 30% by weight of said butadiene rubber.

10. A vulcanizable composition comprising a vulcanizable butadiene rubber mixed with approximately 1 to 30% of cativo resin by weight on the basis of the amount of said butadiene rubber in said composition.

11. A vulcanizable composition comprising a vulcanizable butadiene rubber, rubber compounding ingredients and an amount of cativo resin between approximately 1 and 30% by weight on the basis of the amount of said butadiene rubber in said composition.

12. A composition of matter comprising a butadiene rubber, rubber compounding ingredients, and a substantial amount of an added resin selected from the group consisting of cativo resin and copaiba resin, said resin being present in an amount materially less than the amount of butadiene rubber.

NEIL E. TILLOTSON.